(12) United States Patent
Burton et al.

(10) Patent No.: US 12,033,664 B2
(45) Date of Patent: Jul. 9, 2024

(54) TDS MITIGATION USING DIFFERENT DATA PREAMBLE TONES

(71) Applicant: Western Digital Technologies, Inc., San Jose, CA (US)

(72) Inventors: Derrick E. Burton, Ladera Ranch, CA (US); Robert G. Biskeborn, Hollister, CA (US); James N. Malina, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 22 days.

(21) Appl. No.: 17/849,504

(22) Filed: Jun. 24, 2022

(65) Prior Publication Data

US 2023/0419995 A1 Dec. 28, 2023

(51) Int. Cl.
G11B 21/10 (2006.01)

(52) U.S. Cl.
CPC ................ *G11B 21/103* (2013.01)

(58) Field of Classification Search
None
See application file for complete search history.

(56) References Cited

U.S. PATENT DOCUMENTS

| | | | |
|---|---|---|---|
| 5,276,559 A * | 1/1994 | Sarkisian | G11B 27/323 |
| 5,317,457 A | 5/1994 | Matsumi et al. | |
| 5,323,276 A | 6/1994 | Ono | |
| 5,450,257 A | 9/1995 | Tran et al. | |
| 7,359,132 B2 | 4/2008 | Morling et al. | |
| 8,705,199 B2 | 4/2014 | Saliba et al. | |
| 9,424,880 B2 * | 8/2016 | Nangare | G11B 5/59627 |
| 9,437,242 B1 | 9/2016 | Banh et al. | |
| 9,495,986 B2 | 11/2016 | Cherubini et al. | |
| 9,542,972 B1 * | 1/2017 | Nayak | G11B 20/10055 |
| 9,633,689 B1 * | 4/2017 | Grundvig | G11B 20/1217 |
| 9,825,787 B1 * | 11/2017 | Burton | G11B 5/59627 |
| 10,008,228 B1 * | 6/2018 | Nangare | G11B 20/10314 |
| 2006/0274446 A1 | 12/2006 | Johnson et al. | |
| 2007/0097540 A1 * | 5/2007 | Asakura | G11B 5/59655 |
| | | | 360/77.02 |

(Continued)

OTHER PUBLICATIONS

Roh, Bong Gyun et al., "Single-head/single-track detection in interfering tracks", Jul. 2002, IEEE Transactions on Magnetics, <https://ieeexplore.ieee.org/abstract/document/1017779>.

*Primary Examiner* — Peter Vincent Agustin
(74) *Attorney, Agent, or Firm* — PATTERSON + SHERIDAN, LLP

(57) ABSTRACT

The present disclosure generally relates to a tape drive comprising a tape head and control circuitry. The tape head comprises a plurality of data elements, each data element including a write transducer and a read transducer. The control circuitry is configured to control the tape head to write at least three different frequency preamble tones prior to writing data to data tracks of a tape. A different preamble tone is written to adjacent data tracks of the tape. The data elements of the tape head are each configured to read one or more preamble tones prior to writing data to or reading data from the tape. The control circuitry is then configured to extract a signal content from each preamble tone read by each data element, and determine an optimized positioning for the tape head with respect to the tape to reduce alignment errors.

20 Claims, 11 Drawing Sheets

(56) References Cited

U.S. PATENT DOCUMENTS

| | | | |
|---|---|---|---|
| 2007/0242381 A1* | 10/2007 | Sakurai | G11B 5/855 360/48 |
| 2010/0091400 A1* | 4/2010 | Hamaguchi | G11B 5/02 360/75 |
| 2010/0118690 A1* | 5/2010 | Annampedu | G11B 5/59655 |
| 2011/0199701 A1* | 8/2011 | Bui | G11B 5/584 |
| 2015/0187385 A1* | 7/2015 | Pan | G11B 20/10388 360/45 |
| 2016/0012842 A1* | 1/2016 | Nangare | G11B 20/1217 360/77.04 |

\* cited by examiner

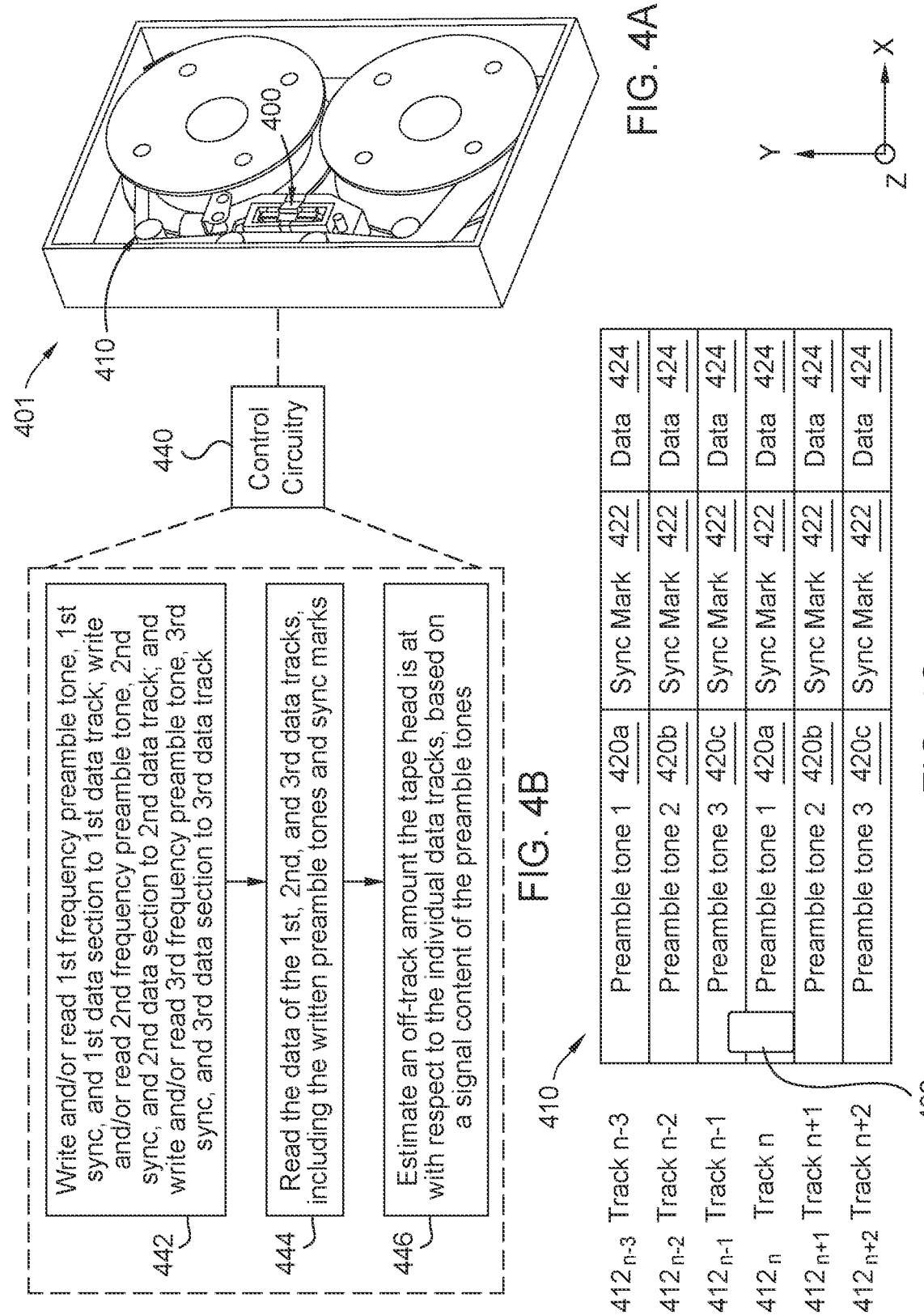

TDS MITIGATION USING DIFFERENT DATA PREAMBLE TONES

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, during the manufacture of the tape. However, tapes will stretch and compress both in tape length and width over time, referred to as tape dimensional stability (TDS) effects, due to a variety of reasons, such as environmental causes like humidity and temperature, workload, and general wear of the tape. As such, as the tape stretches and compresses, the positioning information in the servo tracks will become misaligned with the data tracks, thus making accurate positioning of the tape head difficult. Furthermore, the stretching or compression of the tape has a non-linear component along the width of the tape, making positioning of the tape head even more difficult. As tape capacities increase and track pitch decreases, the non-linear component of TDS becomes an increasingly significant contributor to track m is-registration.

Therefore, there is a need in the art for a tape drive capable of compensating for non-linear and linear tape dimensional stability effects.

SUMMARY OF THE DISCLOSURE

The present disclosure generally relates to a tape drive comprising a tape head and control circuitry. The tape head comprises a plurality of data elements, each data element including a write transducer and a read transducer. The control circuitry is configured to control the tape head to write at least three different frequency preamble tones prior to writing data to data tracks of a tape. A different preamble tone is written to adjacent data tracks of the tape. The data elements of the tape head are each configured to read one or more preamble tones prior to writing data to or reading data from the tape. The control circuitry is then configured to extract a signal content from each preamble tone read by each data element, and determine an optimized positioning for the tape head with respect to the tape to reduce alignment errors.

In one embodiment, a tape drive comprises a tape head comprising: a plurality of write transducers each configured to write data to a plurality of data tracks of a tape, a plurality of read transducers each configured to read data and one or more preamble tones of a plurality of preamble tones from the plurality of data tracks, wherein the plurality of preamble tones each has a different frequency, and one or more servo transducers configured to read servo data from one or more servo tracks of the tape. The tape drive further comprises control circuitry configured to: estimate an off-track amount the tape head is with respect to the plurality of data tracks of the tape based on a signal content of one or more preamble tones of the plurality of preamble tones read by the plurality of read transducers, and position the tape head based on at least the estimated off-track amount and the servo data to reduce alignment errors of the tape head.

In another embodiment, a tape drive comprises a tape head comprising: a plurality of write transducers, the tape head being configured to: write a first preamble tone to a first data track of a plurality of data tracks of a tape, write a second preamble tone different than the first preamble tone to a second data track of the tape, the second data track of the tape being adjacent to the first data track, and write a third preamble tone different from the first and second preamble tones to a third data track of the tape, the third data track of the tape being adjacent to the second data track, wherein the tape head further comprises a plurality of read transducers each configured to read the first, second, and third preamble tones from the first, second, and third data tracks of the tape. The preamble tones are assigned to tracks such that the preamble on every track differs from the preamble of its directly adjacent neighboring tracks. Furthermore, these adjacent tracks will also have differing preamble from one another. The tape drive further comprises control circuitry configured to: extract a signal content from the first, second, and third preamble tones read for each read transducer of the plurality of read transducers, estimate an amount of off-track the tape head is with respect to the tape based on the extracted signal content for each read transducer of the plurality of read transducers, and position the tape head based on the estimate to reduce alignment errors of the tape head.

In yet another embodiment, a tape drive comprises a tape head comprising: a plurality of write transducers, the tape head being configured to write data to a plurality of data tracks of a tape, and a plurality of read transducers each configured to read data and one or more preamble tones of a plurality of preamble tones from the plurality of data tracks, wherein the plurality of preamble tones each have a different frequency. The tape drive further comprises means for extracting a signal content from the one or more preamble tones read for each read transducer of the plurality of read transducers, and means for positioning the tape head based on at least the extracted signal contents to reduce alignment errors of the tape head.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A and 4B illustrate a tape drive comprising at least one tape head configured to access a tape, according to one embodiment.

FIG. 4C illustrates a tape comprising a plurality of data tracks, each data track having a preamble tone, to be utilized with the tape drive of FIGS. 4A-4B, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising a tape head and control circuitry. The tape head comprises a plurality of data elements, each data element including a write transducer and a read transducer. The control circuitry is configured to control the tape head to write at least three different frequency preamble tones prior to writing data to data tracks of a tape. A different preamble tone is written to adjacent data tracks of the tape. The data elements of the tape head are each configured to read one or more preamble tones prior to writing data to or reading data from the tape. The control circuitry is then configured to extract a signal content from each preamble tone read by each data element, and determine an optimized positioning for the tape head with respect to the tape to reduce alignment errors.

Figure 1A:
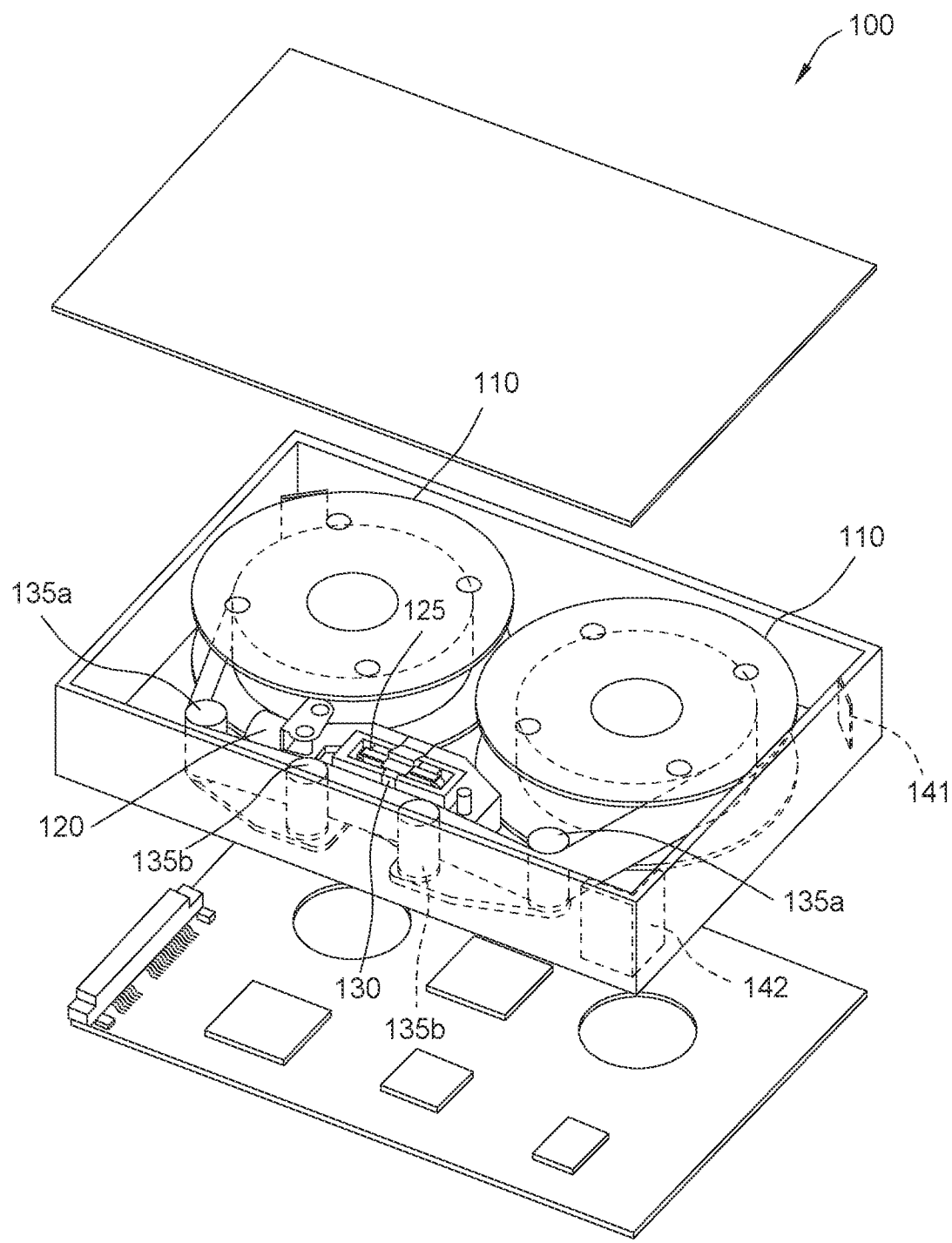
FIGS. 1A-1C illustrate a perspective exploded view, a simplified top down, and side profile view of a tape drive, in accordance with some embodiments.
Figure 1B:
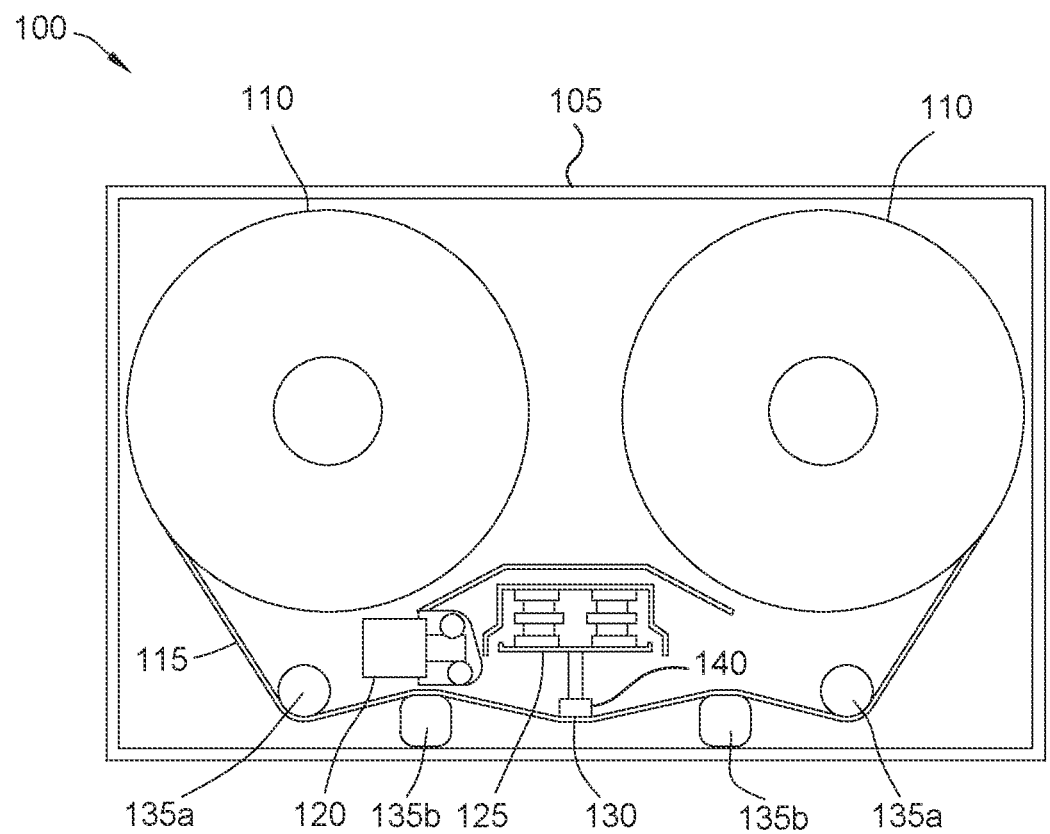
Figure 1C:
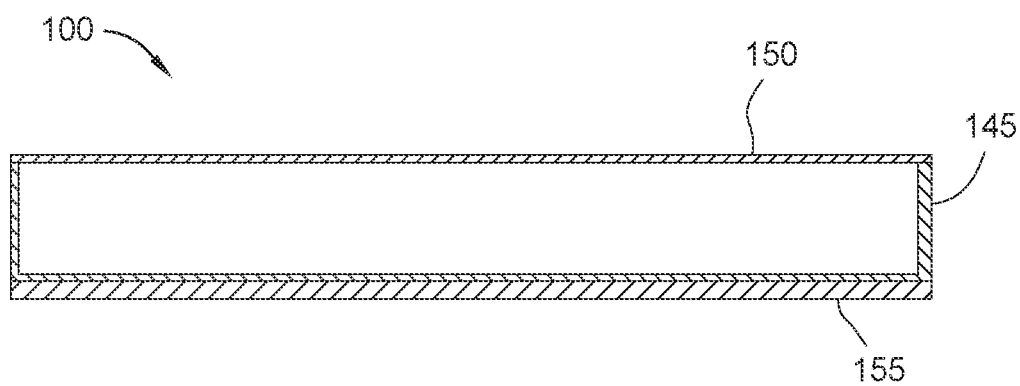

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two functional rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
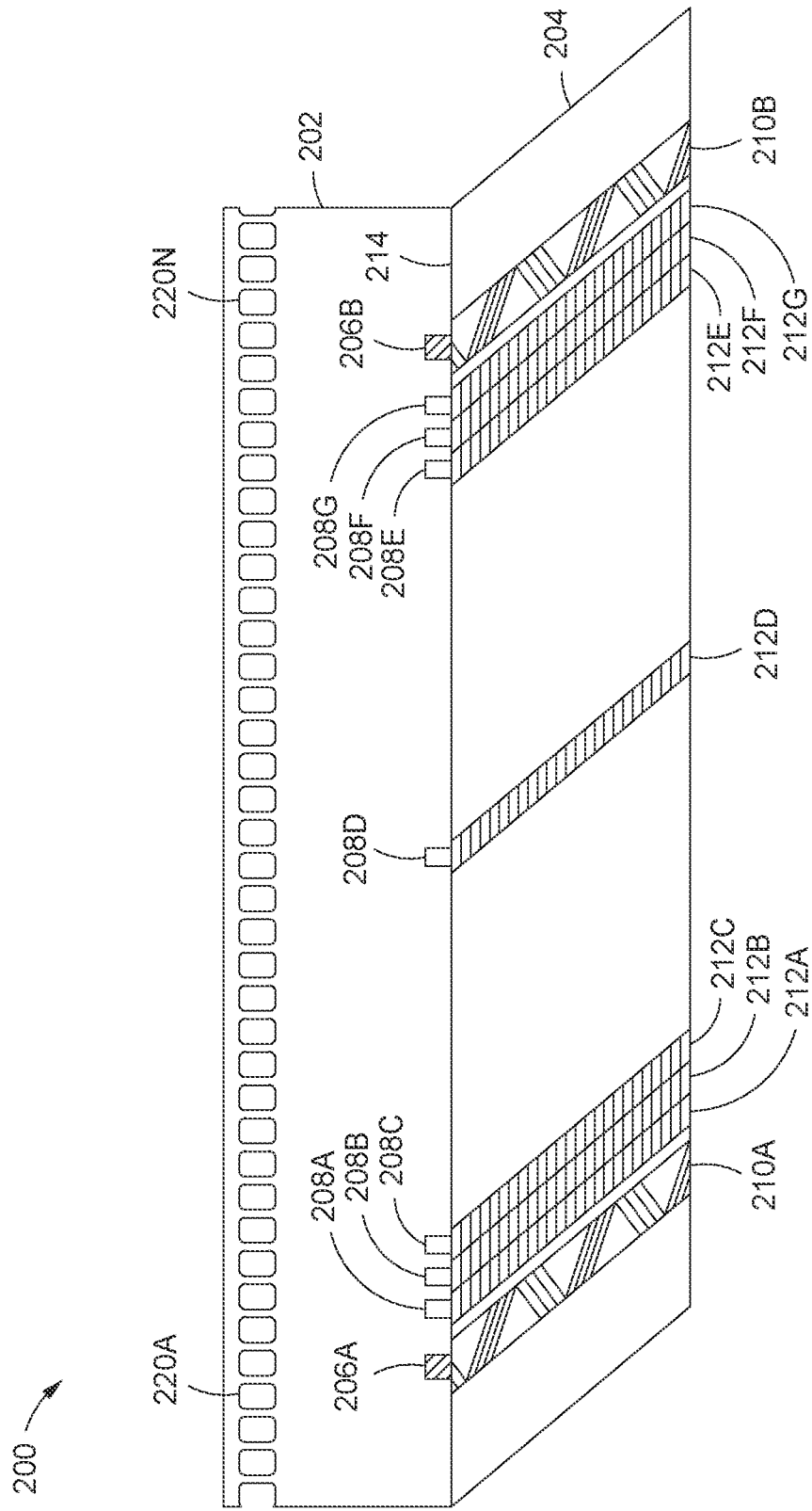
FIG. 2 is a schematic illustration of a tape head and tape that are aligned.

FIG. 2 is a schematic illustration of a portion of a tape head 200 and a tape 204 that are aligned. The tape head 200 comprises a tape head body 202 that is aligned with the tape 204. The tape 204 moves past the tape head 200 during read and/or write operations. The tape head module 200 has a media facing surface (MFS) 214 that faces the tape 204. The tape head 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape head 200 to align the data heads 208A-208G such that the center data track (e.g., 208D) is centered on tape 204. The plurality of data heads 208A-

208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
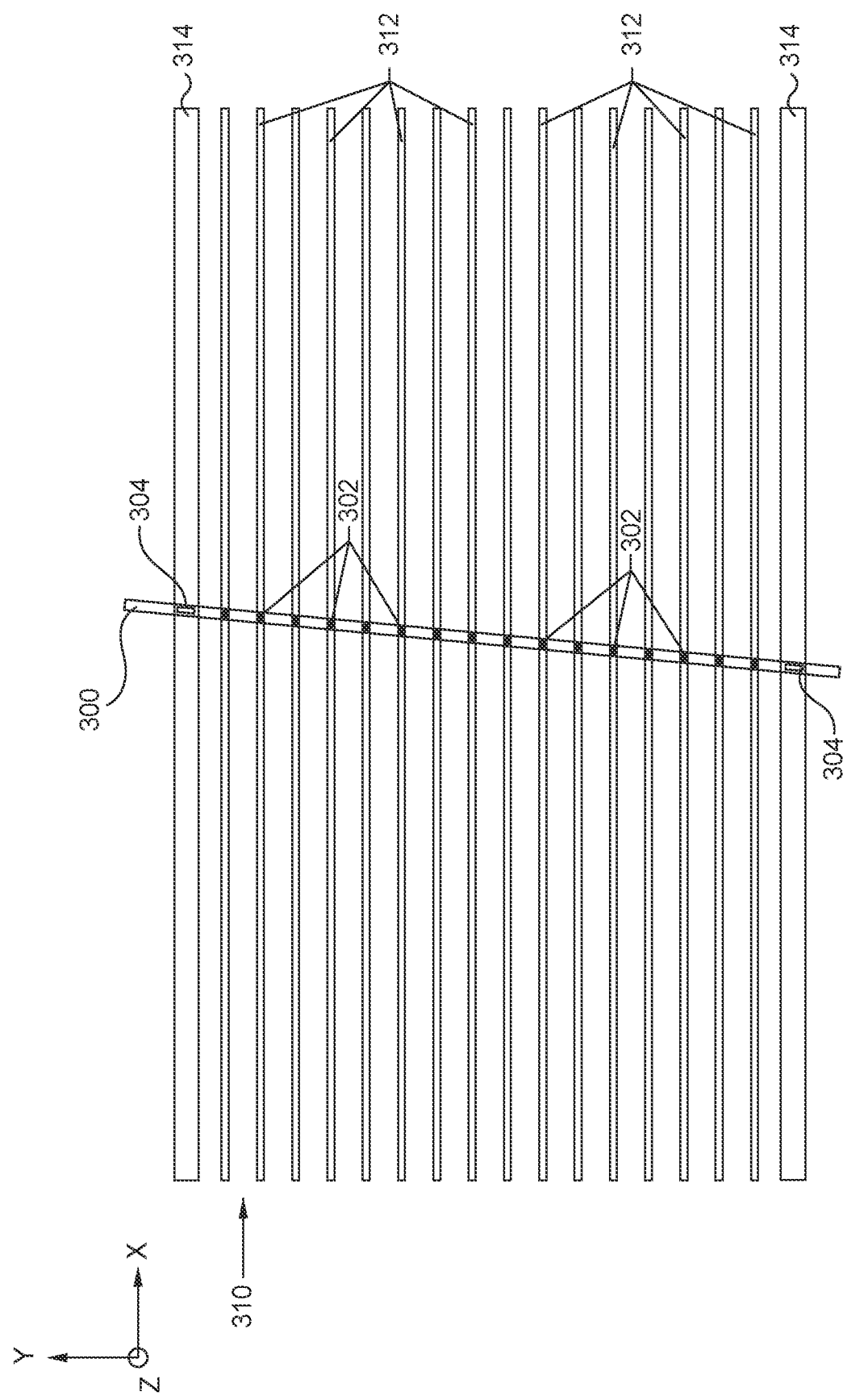
FIGS. 3A-3B illustrate a tape head positioned over a tape experiencing TDS effects, according to various embodiments.
Figure 3B:
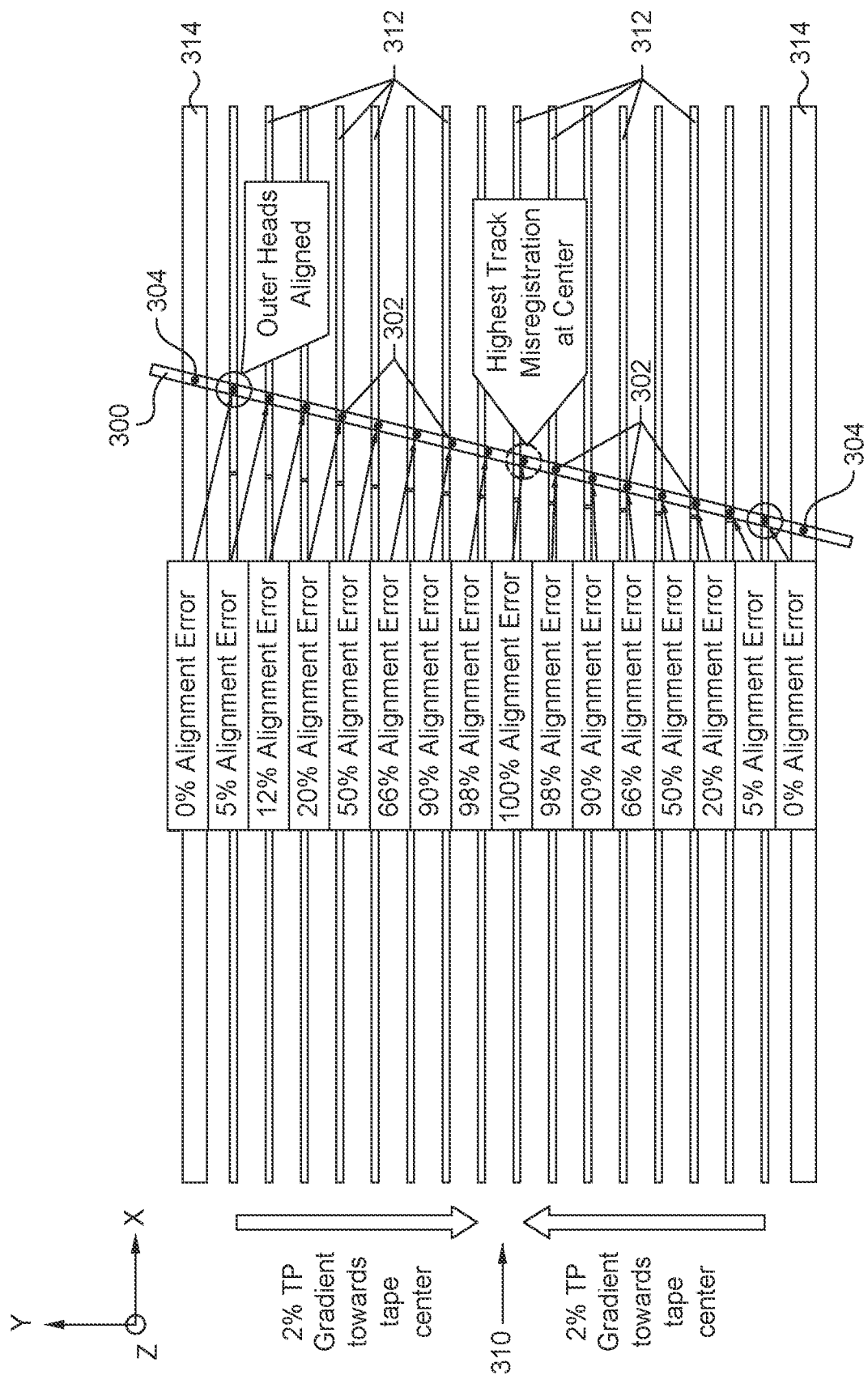

FIGS. 3A-3B illustrate a tape head 300 positioned over a tape 310 experiencing TDS effects, according to various embodiments. The tape head 300 may be within or a part of the tape drive 100 of FIGS. 1A-1C, and/or the tape head 300 may be the tape head 200 of FIG. 2.

The tape head 300 comprises a plurality of data elements 302, where each data head comprises a write transducer (herein referred to as a writer) (not shown) configured to write data to the data tracks 312 of the tape 310 and/or a read transducer (herein referred to as a reader) (not shown) configured to read data from the data tracks 312 of the tape 310. The tape head 300 further comprises one or more servo transducers or servo readers 304 configured to read servo data from one or more servo tracks 314 of the tape 310. While two servo readers 304 and 16 data elements 302 are shown, the tape head 300 may comprise any number of servo readers 304 and any number of data elements 302. As such, the number of servo readers 304 and data elements 302 is not intended to be limiting. Similarly, the number of data tracks 312 and servo tracks 314 of the tape 310 are not intended to be limiting.

In FIG. 3A, the tape 310 experienced linear TDS effects, in which the expansion or compression to the tape 310 was the same for each track 312, 314 of the tape 310. In FIG. 3B, the tape 310 experienced non-linear TDS effects, in which the expansion or compression to the tape 310 was varied for one or more tracks 312, 314 of the tape 310. When a tape 310 experiences no TDS effects (e.g., no compression or expansion), each data element 302 is configured to write to and read from one data track 302, and is perfectly aligned with the data track 302. The tape 310 of FIGS. 3A-3B may be the same tape, such as different positions on a same tape, or different tapes.

In FIG. 3A, since the TDS effects of the tape 310 are linear, the servo readers 304 are able to read the servo tracks 314 to accurately position the tape head 300 for writing and reading data to and from the tape 310. The servo tracks 314 may indicate that the tape head 300 should be tilted towards the x-axis in a clockwise direction, like shown in FIG. 3A, or tilted towards the —x-axis in a counter-clockwise direction, which enables each data element 302 to be accurately positioned or aligned over a data track 312.

However, in FIG. 3B, the TDS effects of the tape 310 are non-linear. For instance, the tape 310 may experience about a 2% track pitch (TP) gradient from each servo track 314 towards the center of the tape 310. As such, if the servo readers 304 are used to position the tape head 300, the outermost data elements 302 disposed closest to the servo readers 304 may be accurately aligned (e.g., experience alignment errors of about 0% to about 20%), but the further data elements 302 positioned away from the servo readers 304 are increasingly misaligned. For example, the centralmost data elements 302 may experience an alignment error of about 90% up to 100%. As such, the centermost data track 412 has the highest mis-registration.

FIGS. 4A and 4B illustrate a tape drive 401 comprising at least one tape head 400 configured to access a tape 410, according to one embodiment. FIG. 4C illustrates a tape 410 comprising a plurality of data tracks $412_{n-3}$-$412_{n+2}$ (which may be referred to herein as data tracks 412) to be utilized with the tape drive 401 of FIGS. 4A-4B, according to one embodiment. The tape drive 401 may be the tape drive 100 of FIG. 1. The tape head 400 may be the tape head 200 of FIG. 2.

The tape head 400 comprises a plurality of data heads 402 (one shown in FIG. 4C), where each data head comprises a write transducer (herein referred to as a writer) (not shown) configured to write data to the data tracks 412 of the tape 410 and/or a read transducer (herein referred to as a reader) configured to read data from the data tracks 412 of the tape 410. The tape head 400 further comprises one or more servo transducers or servo readers (not shown) configured to read servo data from one or more servo tracks of the tape 410.

The tape drive 401 further comprises control circuitry 440 configured to execute the flow diagram of FIG. 4B in accessing the tape 410 of FIG. 4C. At block 442, the control circuitry 440 is configured to cause the tape head to write: (1) a first frequency preamble tone 420a, followed by a first sync mark 422, followed by a first data section 424 (e.g., user data) of a first data track $412n$-3 of the tape 410; (2) a second frequency preamble tone 420b, followed by a second sync mark 422, followed by a second data section 424 (e.g., user data) of a second data track $412n$-2 of the tape 410; and (3) a third frequency preamble tone 420c, followed by a third sync mark 422, followed by a third data section 424 (e.g., user data) of a third data track $412_{n-1}$ of the tape 410. The first, second, and third frequency preamble tones 420a-420c (which may be referred to herein as a preamble tone(s) 420) are all different from one another. The first, second, and third frequency preamble tones 420a-420c are orthogonal to one another such that the first, second, and third frequency preamble tones 420a-420c are not multiplies of each other. While three different preamble tones 420a-420c are shown, more than three different preamble tones may be utilized, or two different preamble tones may be used.

Then at block 444, the control circuitry 440 is configured to cause the tape head 400 to read the data 424 of the tracks $412n$-3, $412n$-2 and $412n$-i. In the course of reading the data, the tape head 400 will also read the written preamble tones 420a-420c and sync marks 442. The sync marks 442 will be used to help with synchronization of signals in the signal processing circuitry.

On the other hand, the different preamble tones 420a-420c will be used to help account for a TDS scenario as described above or other issues causing track mis-registration. Thus, in block 446, the control circuitry 440 is configured to estimate an off-track amount the tape head 400 is at with respect to the individual data tracks, based on a signal content of the preamble tones, as further explained below. Finally, in block 448, the tape head 400 is positioned by the control circuitry 440 based on the estimated off-track amount to reduce alignment errors of the tape head 400.

The flow diagram of FIG. 4B may be repeated one or more times to a plurality of data tracks of the tape, like shown in FIG. 4C. Furthermore, each data track 412 may comprise a plurality of frequency preamble tones 420, sync marks 422, and data sections 424. For example, data may be written to the tape 410 in 4K size sections, in which case, each time a 4K section of data is written, a frequency preamble tone 420 and a sync mark 422 are written prior to the data 424. In one or more embodiments, regardless of the size that data is written to the tape 410, the preamble tone 420 and the sync mark 422 are written each time data is written to a data track 412. In one or more embodiments, each time the preamble tones 420 and the sync marks 422 are written, the preamble tones 420 and the sync marks 422 of each data track 412 are all aligned in the y-direction across a width of the tape 410.

The sync marks 422 are used to synchronize to the symbols of the data 424 when reading the data tracks 412, or to determine the precise position of the data elements 402 of the tape head 400 relative to the position of the data 424 of a specific data track 412. The sync mark 422 may consist of any suitable pattern, wherein in one embodiment the sync mark 422 consists of a pattern that maximizes the probability of accurate detection relative to the preamble tone 420 and the data 424 of a specific data track 412.

Each preamble tone 420a-420c may comprise a periodic signal having a predetermined frequency (e.g., a predetermined number of magnetic transitions at any suitable frequency). The preamble tones 420a-420c are orthogonal to one another so that the preamble tones 420 can be detected separately in the frequency domain. For example, the first preamble tone 420a may be 2T, the second preamble tone 420b may be 3T, and the third preamble tone may be 5T, as 2T, 3T, and 5T frequency tones are orthogonal in that they are not multiples of one another. When reading the data tracks 412, the preamble tones 420 may be processed, for example, to determine the location of a data element 402 over one or more data tracks 412, to synchronize timing recovery, and/or to adjust the gain of the read signal. The preamble tone 420 may be written at any suitable location such as at the beginning of the data tracks 412, and in some embodiments the preamble tone 420 may be written at multiple locations such as a primary preamble tone written at the beginning of the data tracks 412 and a secondary preamble tone written between data segments and/or at the end of the data track 412.

Upon reading one or more preamble tones 420, the tape drive 401 then extracts or demodulates a signal content from each preamble tone 420 using one or more band pass filters (not shown) disposed in the read channel of the tape head 400. In some embodiments, a first band pass filter extracts the signal content from the first preamble tone 420a, a second band pass filter extracts the signal content from the second preamble tone 420b, and a third band pass filter extracts the signal content from the third preamble tone 420c. The one or more band pass filters may be harmonic sensors, for example.

As shown in FIG. 4C, adjacent data tracks 412 of the tape 410 each has a different frequency preamble tone 420a-420c written to them by the tape head 400. For example, data track $412_{n-3}$ has the first preamble tone 420a, adjacent data track $412_{n-2}$ has the second preamble tone 420b, adjacent data track $412_{n-1}$ has the third preamble tone 420c, adjacent data track $412n$ has the first preamble tone 420a, adjacent data track $412_{n+1}$ has the second preamble tone 420b, and adjacent data track $412_{n+2}$ has the third preamble tone 420c. As such, when the tape 410 experiences TDS, either linearly or non-linearly, the position of the tape head 400 over the tape 410 can be determined or estimated based on the extracted signal content from the different preamble tone(s) 420 a data element 402 reads.

For instance, if the tape 410 has experienced non-linear TDS and a data element 402 is trying to write to or read from data track $412n$, like shown in FIG. 4C, the data element 402 may read about 70% of the first preamble tone 420a and about 30% of the third preamble tone 420c. The signal content of the first preamble tone 420a and the third preamble tone 420c are then extracted or demodulated using the one or more band pass filters. The amount the tape head 400 is off-track can then be estimated using the signal contents of the first preamble tone 420a and third preamble tone 420c that can be demodulated from the signal read by the data element 402. Based on the estimate and/or the signal content or amount of different preamble tones 420 being read by the data element 402, the tape drive 401 may determine that the tape head 400 should be adjusted (e.g., moved in the y-direction or –y-direction, or tilted clockwise or counterclockwise) with respect to the tape 410 in order to read a greater percentage of the majority preamble tone read (i.e., the first preamble tone 420a), and thus, to be more accurately aligned with the data track $412n$. In addition to using the preamble tones 420 to position the tape head 400, the servo readers of the tape head 400 may be used as well, like described in FIG. 3B.

By determining or estimating an off-track amount based on the extracted signal content of different preamble tones 420 each data element 402 of the tape head 400 reads, the tape drive 401 can determine an optimal position of the tape head 400 with respect to the tape 410 in order to minimize mis-registration for each data element 402 when compensating for TDS. The tape drive 401 may average the extracted signal content of preamble tones that can be demodulated from each signal read by each data element 402, and select the best position or angle for the tape head 400 resulting in the lowest alignment errors when writing data to or reading data from the tape 410.

Figure 5A:
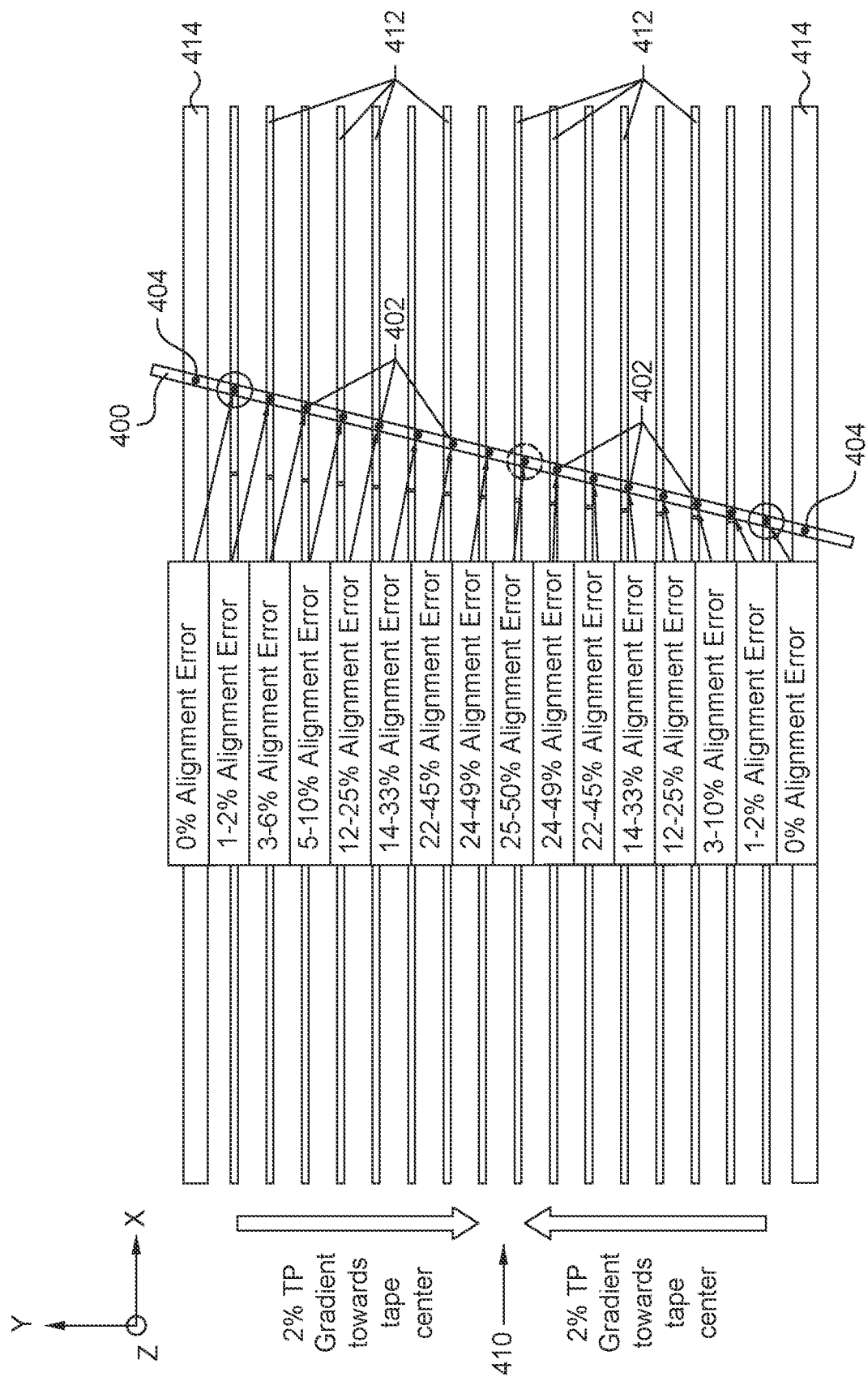
FIGS. 5A-5C illustrate the tape head of FIGS. 4A-4C compensating for TDS using tape head tilt angles and the extracted signal content of different preamble tones each data element of the tape head reads from a tape, according to various embodiments.
Figure 5B:
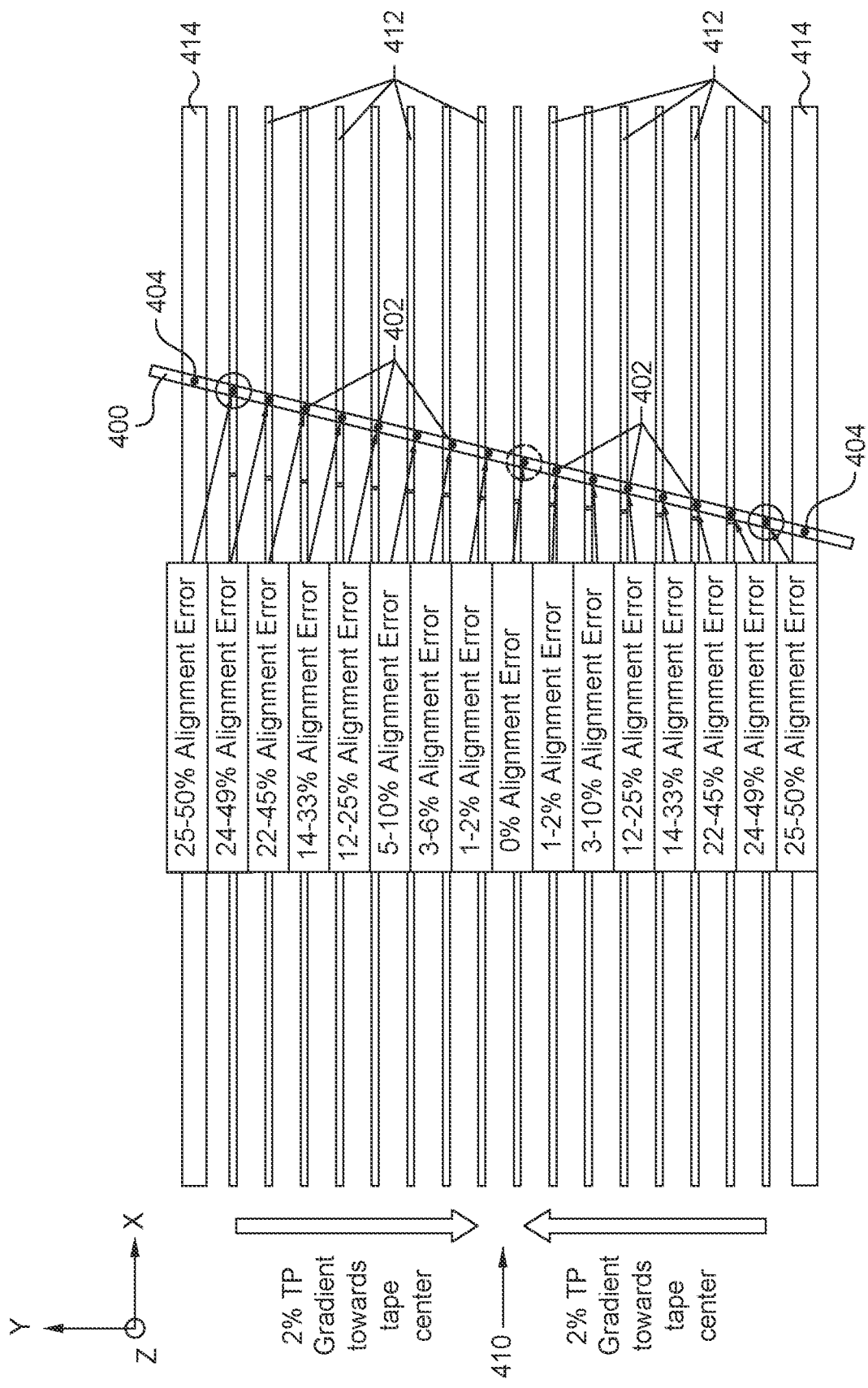
Figure 5C:
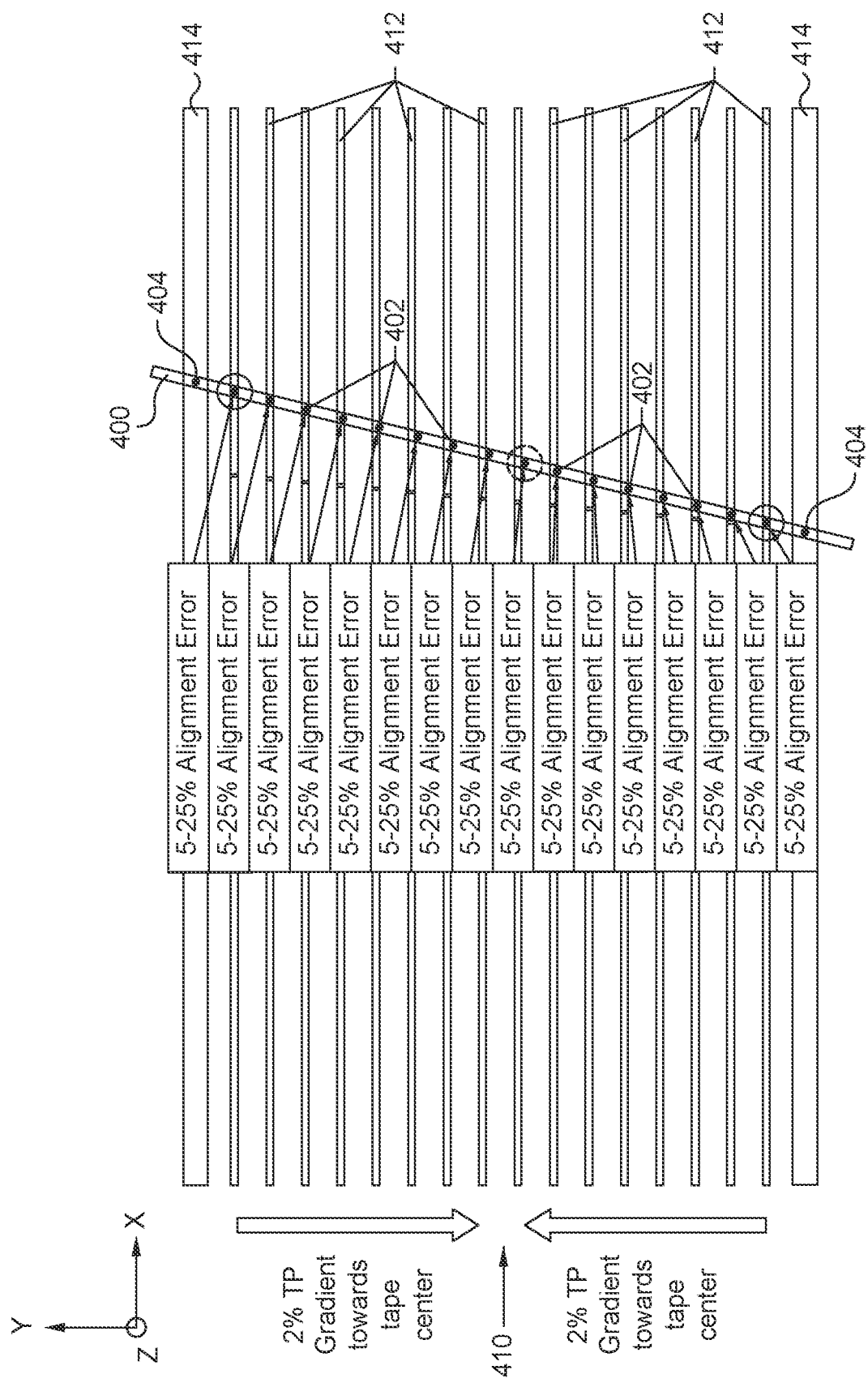

FIGS. 5A-5C illustrate the tape head 400 of FIGS. 4A-4C compensating for TDS using tape head tilt angles and the extracted signal content of different preamble tones 420 each data element 402 of the tape head 400 reads from a tape 410, according to various embodiments. The tape head 400 uses head tilt to compensate for TDS by first determining a center position of the data tracks 412 as a means to estimate data track pitch. The centers of the data tracks 412 are estimated by measuring the signal content of the preamble tones 420 with the head sensors or data elements 402. The estimated centers of the data tracks 412 are then used to estimate an off-track amount of the tape head 400 with respect to the centers of the data tracks 412. In each of Figures the data elements 402 have read one or more preamble tones 420, and the tape drive 401 has estimated the amount the data elements 402 are off-track based on the signal content of preamble tone signals demodulated or extracted. Upon estimating the amount of off-track, the tape drive 401 determines an optimized tilt angle or positioning of the tape head 400 with respect to the tape 410 to minimize mis-registration and alignment errors when writing data to or reading data from the tape 410. Furthermore, in each of FIGS. 5A-5C, adjacent data tracks 412 of the tape 410 have different or orthogonal preamble tones, like shown and described above in FIG. 4C.

As noted above, the tape head 400 comprises a plurality of data elements 402, where each data head comprises a write transducer (herein referred to as a writer) (not shown) configured to write data to the data tracks 412 of the tape 410 and/or a read transducer (herein referred to as a reader) (not shown) configured to read data from the data tracks 412 of the tape 410. The tape head 400 further comprises one or more servo transducers or servo readers 404 configured to read servo data from one or more servo tracks 414 of the tape 410. In addition to using the preamble tones 420 to position the tape head 400, the servo readers 404 may be used as well, like described in FIG. 3B. While two servo readers 404 and 16 data elements 402 are shown, the tape head 400 may comprise any number of servo readers 404 and any number of data elements 402. As such, the number of servo readers 404 and data elements 402 is not intended to be limiting.

Similarly, the number of data tracks 412 and servo tracks 414 of the tape 410 are not intended to be limiting.

FIG. 5A illustrates an optimized tape head 400 position based on the signal content of preamble tone signals demodulated or extracted from each data element 402, where the outer data elements 402 of the tape head 400 are most accurately aligned, according to one embodiment. As shown in FIG. 5A, the outermost data elements 402 disposed closest to the servo readers 404 have about a 0% alignment error. As the data elements 402 get closer to the center of the tape head 400, the alignment error gradually increases. For example, the data elements 402 disposed on the outer ends of the tape head 400 have an alignment error of about 0% to about 2%, about 3% to about 6%, about 5% to about 10%, and about 12% to about 25%. The data elements 402 disposed closer to the center of the tape head 400 experience a greater alignment error, such as about 14% to about 33%, about 22% to about 25%, about 24% to about 49%, and abought 25% to about 50%. Thus, using the preamble tones to position the tape head 400 reduces the alignment errors by at least half as compared to the positioning of the tape head 300 of FIG. 3B.

FIG. 5B illustrates an optimized tape head 400 position based on the signal content of preamble tone signals demodulated or extracted from each data element 402, where the central data elements 402 of the tape head 400 are most accurately aligned, according to another embodiment. As shown in FIG. 5B, the central-most data element 402 disposed furthest from the servo readers 404 has about a 0% alignment error. As the data elements 402 get closer to the servo readers 404, the alignment error gradually increases. For example, the data elements 402 disposed near the center of the tape head 400 have an alignment error of about 0% to about 2%, about 3% to about 6%, about 5% to about 10%, and about 12% to about 25%. The data elements 402 disposed further from the center of the tape head 400, near the servo readers 404, experience a greater alignment error, such as about 14% to about 33%, about 22% to about 25%, about 24% to about 49%, and abought 25% to about 50%. Thus, using the preamble tones to position the tape head 400 reduces the alignment errors by at least half as compared to the positioning of the tape head 300 of FIG. 3B.

FIG. 5C illustrates an optimized tape head 400 position based on the signal content of preamble tone signals demodulated or extracted from each data element 402, where each data element 402 of the tape head 400 is about equally aligned or misaligned, according to yet another embodiment. In FIG. 5C, the alignment error or mis-registration of each data element 402 is spread evenly over each data element 402. As such, each data element 402 experiences a similar alignment error. For example, each data element 402 may experience an alignment error about 5% to about 25%, or about 10% to about 15%. While each data element 402 may not experience the same about of alignment errors, the alignment error of each data element 402 may fall within the same range (e.g., about 5% to about 25%). For example, some data elements 402 may have an alignment error of about 4% to about 9% while other data elements 402 may have an alignment error of about 14% to about 20%, and still other data elements 402 may have an alignment error of about 8% to about 15%. Thus, using the preamble tones to position the tape head 400 reduces the alignment errors by at least half as compared to the positioning of the tape head 300 of FIG. 3B.

Figure 6A:
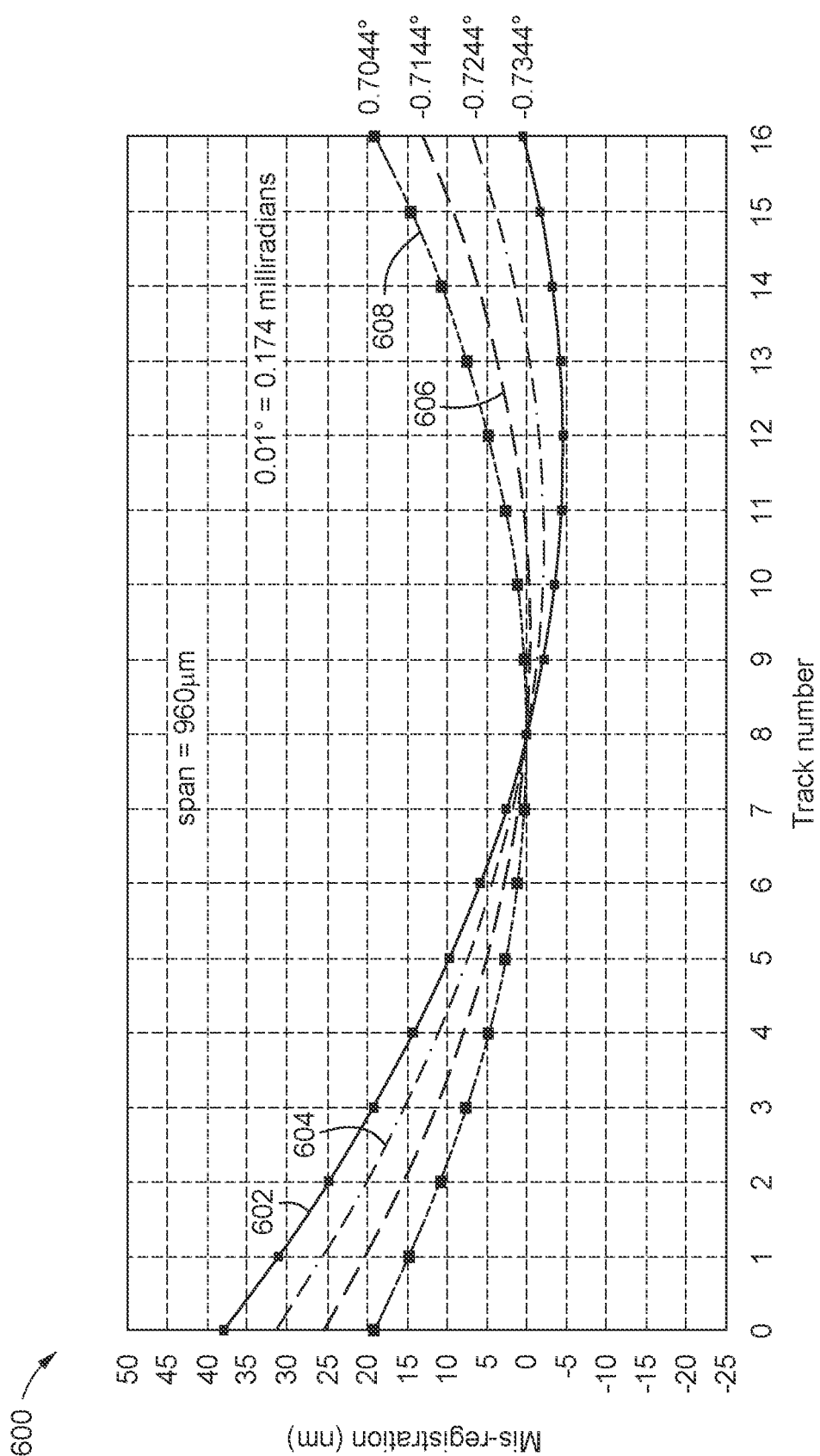
FIG. 6A illustrates a graph showing mis-registration (nm) of the tape head of FIGS. 4A-4C when tilted with respect to a tape experiencing TDS effects for 16 tracks of a tape, according to one embodiment.

FIG. 6A illustrates a graph 600 showing mis-registration (nm) of the tape head 400 of FIGS. 4A-5C when tilted with respect to a tape experiencing TDS effects for 16 tracks of a tape, according to one embodiment.

In the graph 600, the tape head 400 is statically tilted about 5°. Line 608 represents the tape head 400 being tilted an additional about 0.70°, line 606 represents the tape head 400 being tilted an additional about –0.71°, line 604 represents the tape head 400 being tilted an additional about –0.72°, and line 602 represents the tape head 400 being tilted an additional about –0.73°. Thus, line 602 represents the tape head 400 being tilted the greatest amount and line 608 represents the tape head 400 being tilted the least amount. The additional tilting amount of the tape head 400 may be based, at least in part, from the demodulated ratio of preamble tone signals read.

As shown by the graph 600, when the tape head 400 is tilted an additional about –0.73° (line 602), the tape head 400 may be mis-registered a maximum of about 37 nm at the outer tracks (see track 0), but is substantially aligned with the central tracks of the tape (around track 8). When the tape head 400 is tilted an additional about –0.72° (line 604), the tape head 400 may be m is-registered a maximum of about 32 nm at the outer tracks, but is substantially aligned with the central tracks of the tape. When the tape head 400 is tilted an additional about –0.71° (line 606), the tape head 400 may be mis-registered a maximum of about 25 nm at the outer tracks, but is substantially aligned with the central tracks of the tape. When the tape head 400 is tilted an additional about (line 608), the tape head 400 may be m is-registered a maximum of about nm at the outer tracks, but is substantially aligned with the central tracks of the tape. As such, tilting the tape head an additional about 0.70° helps mitigate m is-registration of the tape head 400 with respect to the tape when the tape has experience linear or non-linear TDS effects.

Figure 6B:
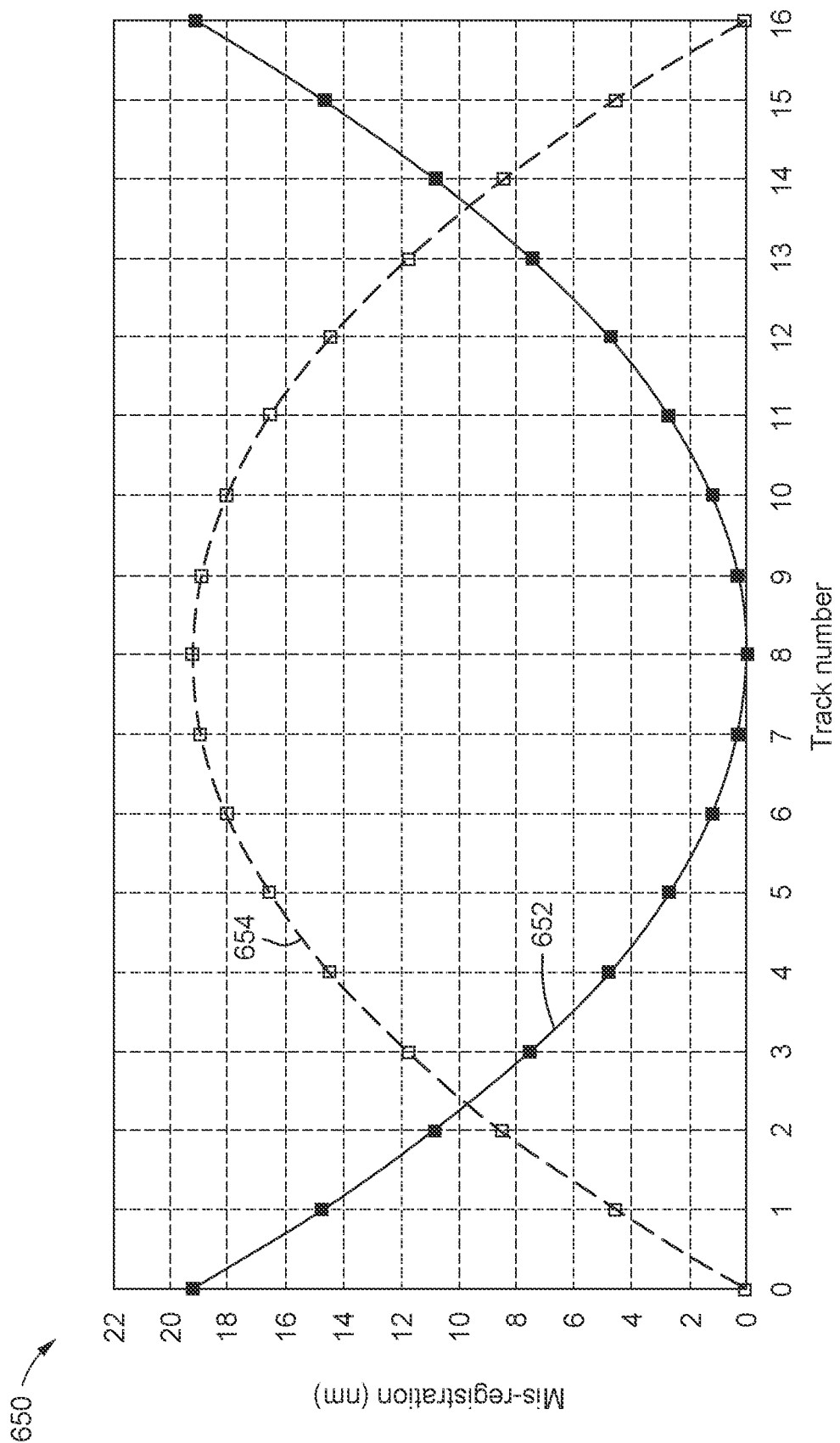
FIG. 6B illustrates a graph showing mis-registration (nm) of the tape head of FIGS. 4A-4C when tilted with respect to a tape experiencing TDS effects when various methods and/or aspects are used to position the tape head, according to one embodiment.

FIG. 6B illustrates a graph 650 showing mis-registration (nm) of the tape head 400 of FIGS. 4A-5C when tilted with respect to a tape experiencing TDS effects when various methods and/or aspects are used to position the tape head 400, according to one embodiment. In the graph 650, the tape head 400 is statically tilted about 5°±–1°.

Line 652 illustrates using the preamble tones of the outer data tracks and/or the servo readers 404 to position the tape head 400, like discussed in FIG. 5A. Line 654 illustrates using the preamble tone of central data tracks and/or the servo readers 404 to position the tape head 400, like discussed in FIG. 5B. The positioning of the tape head 400 is based, at least in part, from the demodulated ratio of preamble tone signals read.

As shown by line 652, when the servo readers 404 and/or preamble tones of the outer data tracks are used to position the tape head 400, the tape head 400 is fairly accurately positioned for tracks 0-3 13-16, but is m is-registered about 10 nm to about 20 nm for the central tracks 4-12. Conversely, when using preamble tones of central data tracks to position the tape head 400, the tape head 400 is fairly accurately positioned for tracks 2-14, and is m is-registered about 10 nm to about 20 nm for only the outermost tracks 0-1 and 15-16. As such, when the tape experiences linear or non-linear TDS, the tape head 400 may be more accurately positioned above a greater number of tracks when the preamble tone tones of central data tracks to position the tape head 400.

Therefore, by determining or estimating an off-track amount based on the signal content of different preamble tones each data element of a tape head reads, a tape drive can determine an optimal position of the tape head 400 respect to the tape in order to minimize mis-registration and alignment errors for each data element when compensating for linear or non-linear TDS. The tape drive may average the signal content of preamble tones that can be demodulated from each signal read by the data elements, and select an optimized position or angle for the tape head that results in the lowest alignment errors or mis-registration of the data tracks. As such, linear and non-linear TDS effects can be mitigated and minimized by the tape drive, resulting in the tape head writing and reading data to and from a tape more accurately.

In one embodiment, a tape drive comprises a tape head comprising: a plurality of write transducers each configured to write data to a plurality of data tracks of a tape, a plurality of read transducers each configured to read data and one or more preamble tones of a plurality of preamble tones from the plurality of data tracks, wherein the plurality of preamble tones each has a different frequency, and one or more servo transducers configured to read servo data from one or more servo tracks of the tape. The tape drive further comprises control circuitry configured to: estimate an off-track amount the tape head is with respect to the plurality of data tracks of the tape based on a signal content of one or more preamble tones of the plurality of preamble tones read by the plurality of read transducers, and position the tape head based on at least the estimated off-track amount and the servo data to reduce alignment errors of the tape head.

Adjacent data tracks of the plurality of data tracks each comprises a different preamble tone of the plurality of preamble tones. The plurality of preamble tones is at least three different preamble tones. Each of the at least three different preamble tones is orthogonal to one another. The plurality of write transducers are each further configured to write a preamble tone of the plurality of preamble tones to each data track of the plurality of data tracks prior to writing data to the plurality of data tracks. The plurality of write transducers are each further configured to write a sync mark to each data track of the plurality of data tracks following the preamble tones and prior to writing data to the plurality of data tracks. The plurality of read transducers are each further configured to read the sync marks written to each data track of the plurality of data tracks. The signal content of the one or more preamble tones is determined for each read transducer, and wherein the signal content of the one or more preamble tones is extracted using one or more band pass filters.

In another embodiment, a tape drive comprises a tape head comprising: a plurality of write transducers, the tape head being configured to: write a first preamble tone to a first data track of a plurality of data tracks of a tape, write a second preamble tone different than the first preamble tone to a second data track of the tape, the second data track of the tape being adjacent to the first data track, and write a third preamble tone different from the first and second preamble tones to a third data track of the tape, the third data track of the tape being adjacent to the second data track, wherein the tape head further comprises a plurality of read transducers each configured to read the first, second, and third preamble tones from the first, second, and third data tracks of the tape. The tape drive further comprises control circuitry configured to: extract a signal content from the first, second, and third preamble tones read for each read transducer of the plurality of read transducers, estimate an amount of off-track the tape head is with respect to the tape based on the extracted signal content for each read transducer of the plurality of read transducers, and position the tape head based on the estimate to reduce alignment errors of the tape head.

The signal contents extracted from the first, second, and third preamble tones are extracted using one or more band pass filters. The first, second, and third preamble tones are orthogonal to one another. The plurality of write transducers are each further configured to write a sync mark and a data section following each preamble tone for the first, second, and third data tracks. The plurality of read transducers are each further configured to read the sync mark and the data section following each preamble tone for the first, second, and third data tracks. The tape head is further configured to write the first, second, and third preamble tones to the plurality of data tracks, where each data track of the plurality of data tracks has a different preamble tone than adjacent data tracks. The tape head further comprises one or more servo transducers configured to read servo data from one or more servo tracks of the tape. The control circuitry is further configured to positon the tape head based on the servo data.

In yet another embodiment, a tape drive comprises a tape head comprising: a plurality of write transducers, the tape head being configured to write data to a plurality of data tracks of a tape, and a plurality of read transducers each configured to read data and one or more preamble tones of a plurality of preamble tones from the plurality of data tracks, wherein the plurality of preamble tones each have a different frequency. The tape drive further comprises means for extracting a signal content from the one or more preamble tones read for each read transducer of the plurality of read transducers, and means for positioning the tape head based on at least the extracted signal contents to reduce alignment errors of the tape head.

The tape drive further comprises means for estimating an off-track amount for the tape head with respect to the plurality of data tracks of the tape based on extracted signal contents. Adjacent data tracks of the plurality of data tracks each comprises a different preamble tone of the plurality of preamble tones, the plurality of preamble tones being orthogonal to one another. The plurality of preamble tones is at least three different preamble tones. The plurality of preamble tones read from each data track of the plurality of data tracks are aligned across a width of a tape. The tape head further comprises one or more servo transducers configured to read servo data from one or more servo tracks of the tape. The means for positioning the tape head is further based on the servo data read by the one or more servo transducers.

While the foregoing is directed to embodiments of the present disclosure, other and further embodiments of the disclosure may be devised without departing from the basic scope thereof, and the scope thereof is determined by the claims that follow.

What is claimed is:

1. A tape drive, comprising:
   a tape head comprising:
      a plurality of write transducers each configured to write data to a plurality of data tracks of a tape;
      a plurality of read transducers each configured to read data and one or more preamble tones of a plurality of preamble tones from the plurality of data tracks, wherein the plurality of preamble tones each has a different frequency; and
      one or more servo transducers configured to read servo data from one or more servo tracks of the tape; and
   control circuitry configured to:
      estimate a center of each of the plurality of data tracks of the tape based on a signal content of one or more preamble tones of the plurality of preamble tones read by the plurality of read transducers;

estimate an off-track amount of the tape head with respect to the plurality of data tracks of the tape based on the estimated centers of the plurality of data tracks; and position the tape head based at least on the estimated off-track amount and the servo data to reduce alignment errors of the tape head, wherein positioning the tape head comprises tilting the tape head in a clockwise direction or a counter-clockwise direction.

2. The tape drive of claim 1, wherein adjacent data tracks of the plurality of data tracks each comprises a different preamble tone of the plurality of preamble tones.

3. The tape drive of claim 1, wherein the plurality of preamble tones is at least three different preamble tones, and wherein each of the at least three different preamble tones is orthogonal to one another.

4. The tape drive of claim 1, wherein the plurality of write transducers are each further configured to write a preamble tone of the plurality of preamble tones to each data track of the plurality of data tracks prior to writing data to the plurality of data tracks.

5. The tape drive of claim 1, wherein the plurality of write transducers are each further configured to write a sync mark to each data track of the plurality of data tracks following the preamble tones and prior to writing data to the plurality of data tracks.

6. The tape drive of claim 5, wherein the plurality of read transducers are each further configured to read the sync marks written to each data track of the plurality of data tracks.

7. The tape drive of claim 1, wherein the signal content of the one or more preamble tones is determined for each read transducer, and wherein the signal content of the one or more preamble tones is extracted using one or more band pass filters.

8. A tape drive, comprising:
a tape head comprising:
a plurality of write transducers, the tape head being configured to:
write a first preamble tone to a first data track of a plurality of data tracks of a tape;
write a second preamble tone different than the first preamble tone to a second data track of the tape, the second data track of the tape being adjacent to the first data track; and
write a third preamble tone different from the first and second preamble tones to a third data track of the tape, the third data track of the tape being adjacent to the second data track,
wherein the tape head further comprises a plurality of read transducers each configured to read the first, second, and third preamble tones from the first, second, and third data tracks of the tape; and
control circuitry configured to:
extract a signal content from the first, second, and third preamble tones read for each read transducer of the plurality of read transducers;
estimate a center of each of the plurality of data tracks to estimate an off-track amount of the tape head with respect to the tape based on the extracted signal contents for each read transducer of the plurality of read transducers; and
position the tape head based on the estimate to reduce alignment errors of the tape head, wherein positioning the tape head comprises tilting the tape head in a clockwise direction or a counter-clockwise direction.

9. The tape drive of claim 8, wherein the signal contents extracted from the first, second, and third preamble tones are extracted using one or more band pass filters, and wherein the first, second, and third preamble tones are orthogonal to one another.

10. The tape drive of claim 8, wherein the plurality of write transducers are each further configured to write a sync mark and a data section following each preamble tone for the first, second, and third data tracks.

11. The tape drive of claim 10, wherein the plurality of read transducers are each further configured to read the sync mark and the data section following each preamble tone for the first, second, and third data tracks.

12. The tape drive of claim 8, wherein the tape head is further configured to write the first, second, and third preamble tones to the plurality of data tracks, where each data track of the plurality of data tracks has a different preamble tone than adjacent data tracks.

13. The tape drive of claim 8, wherein the tape head further comprises one or more servo transducers configured to read servo data from one or more servo tracks of the tape.

14. The tape drive of claim 13, wherein the control circuitry is further configured to position the tape head based on the servo data.

15. A tape drive, comprising:
a tape head comprising:
a plurality of write transducers, the tape head being configured to write data to a plurality of data tracks of a tape; and
a plurality of read transducers each configured to read data and one or more preamble tones of a plurality of preamble tones from the plurality of data tracks, wherein the plurality of preamble tones each have a different frequency;
means for extracting a signal content from the one or more preamble tones read for each read transducer of the plurality of read transducers;
means for estimating a center of each of the plurality of data tracks based on the extracted signal content;
means for estimating an off-track amount of the tape head with respect to the tape based on the estimated centers of the plurality of data tracks; and
means for positioning the tape head based on at least the extracted signal contents and estimate to reduce alignment errors of the tape head, wherein the means for positioning the tape head comprises tilting the tape head in a clockwise direction or a counter-clockwise direction.

16. The tape drive of claim 15, further comprising means for estimating an off-track amount for the tape head with respect to the plurality of data tracks of the tape based on extracted signal contents.

17. The tape drive of claim 15, wherein adjacent data tracks of the plurality of data tracks each comprises a different preamble tone of the plurality of preamble tones, the plurality of preamble tones being orthogonal to one another.

18. The tape drive of claim 15, wherein the plurality of preamble tones is at least three different preamble tones.

19. The tape drive of claim 15, wherein the plurality of preamble tones read from each data track of the plurality of data tracks are aligned across a width of a tape.

20. The tape drive of claim 15, wherein the tape head further comprises one or more servo transducers configured to read servo data from one or more servo tracks of the tape, and wherein the means for positioning the tape head is further based on the servo data read by the one or more servo transducers.

\* \* \* \* \*